United States Patent [19]

Hodohara

[11] Patent Number: 5,187,711
[45] Date of Patent: Feb. 16, 1993

[54] ERROR CORRECTION METHOD FOR MULTICARRIER RADIO TRANSMISSION SYSTEM

[75] Inventor: Kiyoaki Hodohara, Otawara, Japan

[73] Assignee: Fujitsu Limited, Kawasaki, Japan

[21] Appl. No.: 892,499

[22] Filed: Jun. 3, 1992

Related U.S. Application Data

[63] Continuation of Ser. No. 409,712, Sep. 20, 1989, abandoned.

[30] Foreign Application Priority Data

Sep. 20, 1988 [JP] Japan ................................ 63-236010

[51] Int. Cl.⁵ .............................................. H04L 1/22
[52] U.S. Cl. ........................................ 371/7; 371/8.2; 371/11.2; 455/59; 455/63
[58] Field of Search ...................... 371/7, 8.1, 8.2, 9.1, 371/11.1, 11.2, 11.3, 36

[56] References Cited

U.S. PATENT DOCUMENTS

| | | | |
|---|---|---|---|
| 3,803,568 | 4/1974 | Higashide | 371/8.1 |
| 3,859,513 | 1/1975 | Chuang et al. | 371/36 |
| 4,719,629 | 1/1988 | Wang | 371/36 |
| 4,829,198 | 5/1989 | Maley et al. | 371/36 |

FOREIGN PATENT DOCUMENTS

0164749 12/1985 European Pat. Off. .
2147177A 5/1985 United Kingdom .

OTHER PUBLICATIONS

A. Avizienis, Fault Tolerance: The Survival Attribute of Digital Systems, Proceedings of the IEEE, vol. 66., No. 10, Oct. 1978, pp. 1109-1125.
Duke et al., Error Masking, IBM Technical Discl. Bulletin, vol. 12, No. 6, Nov. 1969, pp. 860-861.
Patent Abstracts of Japan, vol. 8, No. 53 (E-231) [1490], Mar. 9, 1984; & JP-A-58 206 255 (Tokyo Shibaura Denki) Jan. 12, 1983.

Primary Examiner—Charles E. Atkinson
Attorney, Agent, or Firm—Staas & Halsey

[57] ABSTRACT

An error correction system for a multicarrier radio transmission system is provided. At the transmission end, a frame alignment bit and error correction bits are added to each of the signals from a serial/parallel converter. Positions of the frame alignment bits in the signals are controlled by a common frame counter. The signals added to frame alignment bits and error correction bits are radio transmitted on several carriers. At the receiving end, frame alignment of each demodulated signal is established based on demodulated signals transmitted on two carriers. Therefore, even if one carrier is deteriorated, frame alignment of data signals on the carrier can be established based on the frame alignment bit in the other data signal on the intact other carrier.

10 Claims, 2 Drawing Sheets

ERROR CORRECTION METHOD FOR MULTICARRIER RADIO TRANSMISSION SYSTEM

This application is a continuation of application Ser. No. 07/409,712, filed Sep. 20, 1989, now abandoned.

BACKGROUND OF THE INVENTION

1. Field of the Invention

This invention relates to a multicarrier radio transmission system and, in particular, to an error correcting method in the radio transmission system.

Recent radio transmission systems with their increasing transmission capacities tend to use multilevel or multicarrier schemes. They also require forward error correction to improve the system gain. Some synchronization is needed for such error correction. In particular, synchronism must be held where the error rate is as high as about $10^{-2}$.

2. Description of the Prior Art

FIG. 2 is a block diagram of a conventional scheme. In this figure, component 1 is a serial/parallel converter; component 2 is a frame alignment bit and error correction bit addition circuit; component 2A is a frame counter; component 3 is a modulator; and component 4 is a transmitter. These circuits are provided at the transmitting end. Frame alignment bit and error correction bit addition circuit 2, frame counter 2A, modulator 3, and transmitter 4 are provided in two sets.

For example, when a 100 Mb/s signal is fed to serial/parallel converter 1, it is branched into four 25 Mb/s signals. Each combination of two 25 Mb/s signals is fed to the frame alignment bit addition circuit 2, where a frame alignment bit and error correction bit added. The position of frame alignment bit addition is controlled by frame counter 2A provided for each frame alignment bit addition circuit 2.

The signal from each frame alignment bit and error correction bit addition circuit 2 is fed to modulator 3 to achieve 4PSK for example, and is then transmitted on a carrier depending on transmitter 4. In this example, one 100 Mb/s signal is radio transmitted on two separate carriers.

Component 5 is a receiver; component 6 is a demodulator; component 7 is a frame alignment and error correcting circuit; component 8 is a parallel/serial converter. These circuits are provided at the receiving end. Receiver 5, demodulator 6, and frame alignment and error correcting circuit 7 are provided in two sets corresponding to the number of carriers.

The signal on each carrier enters receiver 5, is demodulated by demodulator 6, and is fed to frame alignment and error correcting circuit 7, where frame alignment is established. Error correction is performed using the error correction bit and according to the established alignment position.

The signal from each frame alignment and error correcting circuit 7 is fed to parallel/serial converter 8, which converts the four 25 Mb/s signals into a 100 Mb/s signal.

The above conventional scheme, however, has the following problem. Among two radio transmission lines MC1 and MC2, if line MC2 is considerably deteriorated, frame alignment is lost at frame alignment error correcting line 7 corresponding to circuit MC2. As a result, error correction becomes impossible on the MC2 signal. This causes the error rate of the 100 Mb/s output to be $\frac{1}{2}$, thus lowering the system gain.

SUMMARY OF THE INVENTION

This invention is directed to providing an error correction method for multicarrier radio transmission systems in order to solve the above problem involved in the conventional scheme. If one of multiple radio transmission lines is considerably deteriorated, the method allows error correction to be performed by keeping frame alignment for the signal on the deteriorated circuit.

This error correction method for multicarrier radio transmission systems is characterized by its frame alignment detection code and error correction bit addition circuits which are configured so that they are controlled by a common frame counter and its frame alignment and error correcting circuits which are configured so that they are supplied with different carrier signals.

In this configuration, each frame alignment detection code and error correction bit addition circuit at the transmitting end adds a code for frame alignment detection and bits for error correction to the signal. The frame alignment detection code and error correction bit addition circuits are controlled by a common frame counter so that they insert codes for frame alignment detection and bits for error correction at an identical position. At the receiving end, different carrier signals are fed to the frame alignment and error correcting circuits.

Even if some of the multiple radio transmission lines are considerably deteriorated, frame alignment can be established using the carrier signal from a transmission circuit which is not deteriorated because the frame alignment error correcting circuits are supplied with different carrier signals. This permits the deteriorated transmission circuit to keep frame alignment and allows errors to be corrected on that transmission circuit.

DESCRIPTION OF THE PREFERRED EMBODIMENT OF THE INVENTION

An embodiment of the present invention is described below with reference to FIG. 1.

Figure 1:
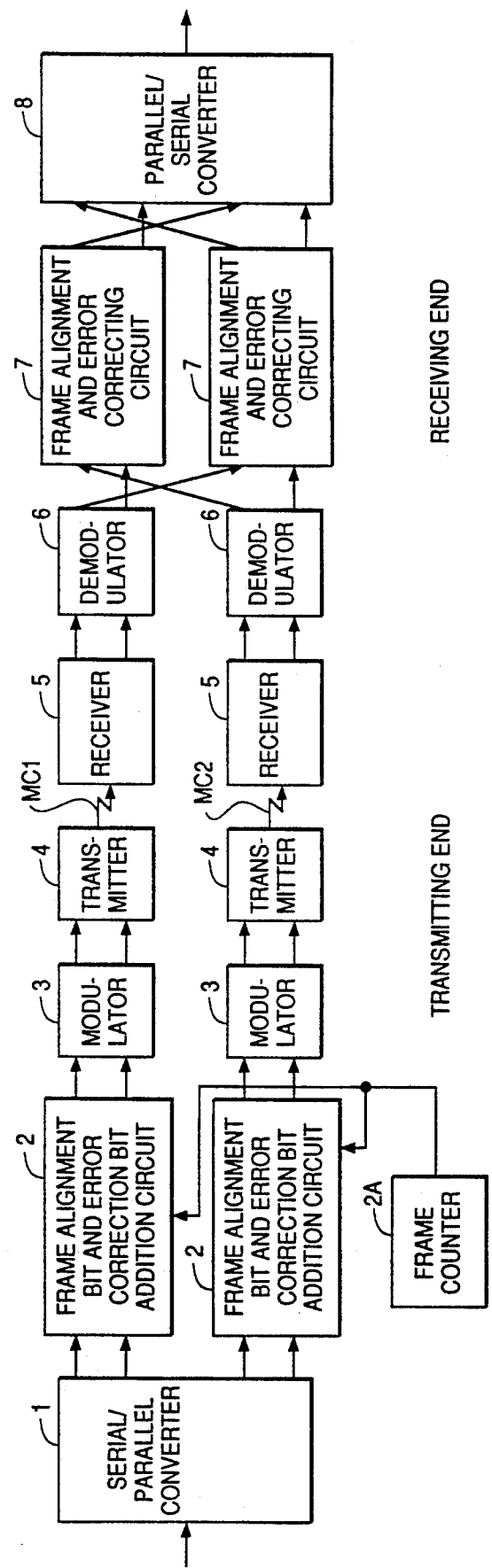
FIG. 1 is a block diagram of an embodiment according to the present invention.
Figure 2:
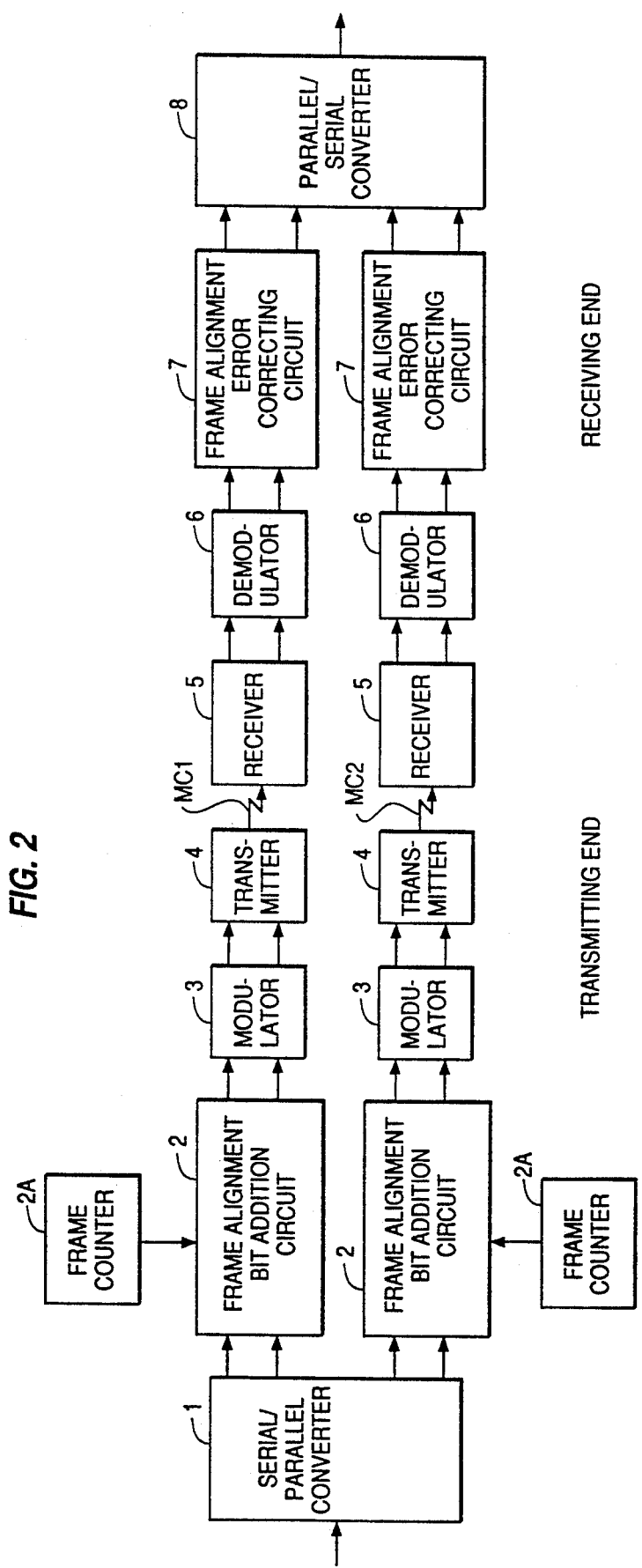
FIG. 2 is a block diagram of a prior art radio transmission system.

FIG. 1 is a block diagram of an embodiment of this invention. In FIG. 1, the transmitting end is provided with serial/parallel converter 1, frame alignment bit and error correction bit addition circuit 2, frame counter 2A, modulator 3, and transmitter 4. Two sets of the frame alignment bit and error correction bit addition circuit 2, modulator 3, and transmitter 4 are provided. Frame counter 2A serves two frame alignment bit and error correction bit addition circuits 2. As a result, the positions of frame alignment bit insertion are identical on both signals.

As the frame alignment bit and error correction bit addition circuit 2, a conventional circuit such as, for example, TRANSMIT CODE CONVERTER described in "INSTRUCTION MANUAL FOR MD140-100S: MODEM-SWITCH EQUIPMENT (64-QAM, 140 Mb/s) Vol. 1/3" of FUJITSU LIMITED, can be used.

The receiving end is provided with receiver 5, demodulator 6, frame alignment and error correcting circuit 7, and parallel/serial converter 8. Receiver 5, demodulator 6, and frame alignment and error correcting circuit 7 are provided in two sets corresponding to the number of carriers.

Frame alignment and error correcting circuits 7 are designed so that they are supplied with different carrier signals. If one of the radio transmission lines MC1 and MC2 is considerably deteriorated, frame alignment and error correcting circuits 7 are still supplied with different carrier signals.

As the frame alignment and error correcting circuit 7, a conventional circuit such as, for example, RECEIVE CODE CONVERTER, described in the above-mentioned document can be used. As an error correction method in the frame alignment bit and error correction bit addition circuit 2 and the frame alignment and error correcting circuit 7, an ordinary correction method for a radio transmission system, for example, a Hamming error correction code, can be applied.

At the transmitting end in the above configuration, serial/parallel converter 1 branches a 100 Mb/s signal (for example) into four 25 Mb/s signals. The combination of two 25 Mb/s signals is fed to the frame alignment bit and error correction bit addition circuit 2, where a frame alignment bit is added to each of the two signals. The frame alignment bit and error correction bit addition circuits 2 are controlled by common frame counter 2A so that the frame alignment bit and error correction bit are inserted at an identical position on both signals.

The signal from each frame alignment bit and error correction bit addition circuit 2 is fed to modulator 3 to achieve 4PSK, for example. The signal is then transmitted on a carrier depending on transmitter 4. In this example, one 100 Mb/s signal is radio transmitted on two carriers.

At the receiving end, the signal on each carrier is fed to receiver 5, is demodulated by demodulator 6, and is fed to frame alignment and error correcting circuit 7, which establishes frame alignment and corrects errors using the error correction bit and according to the established alignment position.

The signal from each frame alignment and error correcting circuit 7 is fed to the parallel/serial converter 8, which converts the four 25 Mb/s signals into one 100 Mb/s signal.

Suppose that one — MC1 for example — of the multiple radio transmission lines MC1 and MC2 is considerably deteriorated. Since frame alignment and error correcting lines are still supplied with different carrier signals, frame alignment can be established using the intact carrier signal although half of the input data is deteriorated. Therefore, the deteriorated transmission line MC1 can still keep frame alignment. Error correction is thus possible on the signal from the deteriorated transmission circuit. This helps increase the system gain.

In the stage of error correction, frame alignment is established according to the position of frame alignment bit insertion. It is also possible to detect frame alignment according to another appropriate code. For the latter scheme, frame alignment detection code and error correction bit addition circuits are provided to add a code for frame alignment detection in place of the frame alignment bit and error correction bit addition circuits. As in the case of the above embodiment, these frame alignment detection code and error correction bit addition circuits are controlled by a common frame counter.

It is to be understood that the foregoing description is merely illustrative of the preferred embodiments of the present invention, that the present invention is not to be limited thereto, but is to be determined by the scope of the appended claim.

What is claimed is:

1. An error correction system in a multicarrier radio transmission system, comprising:

first means for providing a plurality of parallel data signals;

second means, operatively connected to said first means, for adding frame alignment bits and error correction bits to the data signals respectively, and outputting framed data signals;

third means, operatively connected to each of said second means, for commonly controlling the position of the frame alignment bits to the data signals;

fourth means, operatively connected to said second means, for modulating a plurality of carriers which have different frequencies from each other, by framed data signals respectively, and outputting modulated signals;

fifth means, operatively connected to said fourth means, for transmitting the modulated signals;

sixth means, operatively connected to said fifth means, for receiving the transmitted signals;

seventh means, operatively connected to said sixth means, for demodulating the received signals and outputting demodulated data signals; and eighth means, commonly connected to said seventh means, for establishing frame alignment of each demodulated data signal based on demodulated data signals on at least two of the plurality of carriers and for correcting errors in the demodulated signals using the error correction bits respectively, wherein, when frame alignment of one of the demodulated data signals is not established, error correction of the one of the data demodulated signals is performed based on frame alignment of other demodulated signals.

2. An error correction system as set forth in claim 1, wherein said third means comprises a frame counter which indicates timing for adding frame alignment bits.

3. An error correction system as set forth in claim 1, wherein each of said parallel data signals comprise a plurality of bits.

4. An error correction system as set forth in claim 3, wherein said first means comprises a serial-to-parallel converter which receives a serial signal and outputs an m×n bit parallel signal.

5. An error correction system as set forth in claim 4, wherein said second means comprises m frame alignment bit addition circuits, each receiving an n bit parallel signal.

6. An error correction system as set forth in claim 5, wherein said n bit parallel signal comprises two bits.

7. An error correction system as set forth in claim 6, wherein said fourth means comprises first and second 4-phase shift keying modulators.

8. An error correction system as set forth in claim 7, wherein said seventh means comprises first and second 4-phase shift keying demodulators, each of which outputs a two bit signal.

9. An error correction system as set forth in claim 8, wherein said eighth means comprises:

first frame alignment and error correction circuits, operatively connected to said first and second demodulators, for receiving one bit of the two bit signal output from said first demodulator and one bit of the two bit signal output from said second demodulator; and second frame alignment and error correction circuits, operatively connected to said first and second demodulators, for receiving the other bit of the two bit signal output from said first demodulator and the other bit of the two bit signal output from said second demodulator.

10. An error correction system as set forth in claim 9, further comprising a parallel to serial converter, operatively connected to said first and second frame alignment and error correction circuits, for receiving parallel signals output from said first and second frame alignment error correction circuits, and outputting a serial signal.

* * * * *

UNITED STATES PATENT AND TRADEMARK OFFICE
CERTIFICATE OF CORRECTION

PATENT NO. : 5,187,711

DATED : FEBRUARY 16, 1993

INVENTOR(S) : Kiyoaki HODOHARA

It is certified that error appears in the above-identified patent and that said Letters Patent is hereby corrected as shown below:

Col. 1, line 34, "bit addition" should be --bit and error correction bit addition--;

line 35, "bit added." should be --bits are added.--;

line 67, "circuit MC2." should be --line MC2.--.

Signed and Sealed this

Fourteenth Day of December, 1993

Attest:

BRUCE LEHMAN

Attesting Officer    Commissioner of Patents and Trademarks